United States Patent [19]

Swartz et al.

[11] 3,879,682

[45] Apr. 22, 1975

[54] ELECTRONIC TUNING SYSTEM FOR HIGH POWER CAVITY OSCILLATORS

[75] Inventors: Earl E. Swartz; Domenick P. Viterisi, both of Ft. Wayne, Ind.

[73] Assignee: The United States of America as represented by the Secretary of the United States Air Force, Washington, D.C.

[22] Filed: June 12, 1974

[21] Appl. No.: 478,552

[52] U.S. Cl. ................ 331/96; 331/107 R; 331/179
[51] Int. Cl. ............................................ H03b 5/18
[58] Field of Search ............. 331/96, 101, 107, 179

[56] References Cited

UNITED STATES PATENTS 3,417,351 12/1968 Di Piazza .......................... 331/101
3,628,183 12/1971 Strenglein ............................ 331/96
3,755,758 8/1973 Leeson ............................... 331/101

*Primary Examiner*—John Kominski
*Attorney, Agent, or Firm*—Robert Kern Duncan

[57] ABSTRACT

An inductive loop is inserted through the cavity wall into the cavity of a cavity tuned high power oscillator. The inductive loop is terminated in a PIN diode whose characteristics, and the resulting inductive reactance presented by the loop to the cavity, are controlled by a direct current bias voltage applied across the diode. Changes in the inductive reactance of the loop changes the inductance of the cavity and hence the tuned frequency of the oscillator.

3 Claims, 8 Drawing Figures

ELECTRONIC TUNING SYSTEM FOR HIGH POWER CAVITY OSCILLATORS

RIGHTS OF THE GOVERNMENT

The invention described herein may be manufactured and used by or for the Government of the U.S. for all governmental purposes without the payment of any royalty.

BACKGROUND OF THE INVENTION

The field of the invention is in the art of tuning cavity oscillators.

Early methods of tuning resonant circuit cavities were accomplished by manual or electromechanical physical changes in the cavity. This type of tuning (changing frequency) required considerable time and could not be done during normal operation. More recent attempts to electronically shift or change the resonant frequency of operation of a tuned cavity are exemplified by U.S. Pat. No. 3,512,105 to patentees Lance et al. In the Lance et al device a first varactor diode resonant circuit is coupled to a resonant line inside the cavity at a current antinode (peak) position on the line and a second varactor diode resonant circuit is coupled to the system at a voltage antinode position of the line. The varactor diodes function as variable capacitors changing in capacitance as the bias voltages across them are changed, thus tuning the resonant line within the cavity. U.S. Pat. No. 3,628,183 to patentees Strenglein et al. discloses the use of a PIN diode for stabilizing the oscillation carrier frequency of self-limiting type oscillators as variations in the loading of the oscillator circuit occur.

SUMMARY OF THE INVENTION

The invention provides a modification that is small, light weight, inexpensive, and reliable in operation, to a cavity resonator so that the resonant frequency of the cavity may be electronically switched while the resonant cavity is in normal operation.

DESCRIPTION OF THE PREFERRED EMBODIMENT

Figure 1:
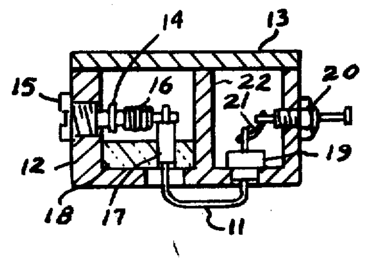
FIG. 1 is a representative pictorial view of an embodiment of an inductive loop and PIN diode assembly.
Figure 3:
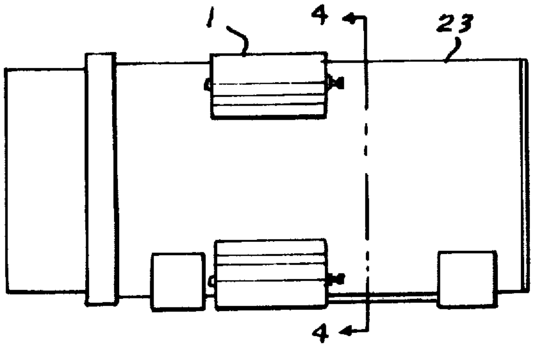
FIG. 3 is a pictorial view of a cavity resonator having four inductive loops.
Figure 4:
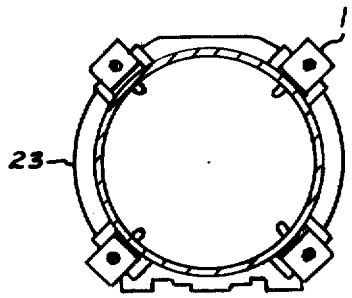
FIG. 4 is a cross section view of the cavity shown in FIG. 3 illustrating the inductive loops extending into the cavity.

It is frequently desirable to rapidly (in less than 10 microseconds) shift the resonant frequency of a high power cavity oscillator. To rapidly change the physical dimensions of a cavity so as to change its resonant frequency is impractical. By having an inductive loop extending into the cavity so that it is coupled with the cavity will change the resonant frequency of the cavity. By changing the inductance presented by the loop to the cavity the resultant resonant frequency of the cavity with the coupled loop is changed. The inductance of the loop may be changed from that of substantially a closed circuit loop to that of an open circuit loop in less than 10 $\mu$sec by connecting the loop in series with a PIN diode and then switching the diode from an "open" circuit condition to "short" circuit condition with a suitable direct current bias. It is also common terminology to refer to one end of the loop as being terminated by the PIN diode and the other end of the loop being terminated to ground (at radio frequencies) through the capacitance of a feed through filter. The end of the loop connected to the PIN diode is then either terminated to ground when the diode is forward biased, or terminated in substantially an open circuit when the diode is reversed biased. Embodiments of the invention have been constructed using four loop assemblies as shown in FIG. 1 coupled to a resonant cavity as shown in FIGS. 3 and 4 to provide approximately a three percent frequency change in cavities operating in the "C" band at approximately a 4 kw peak power level and at a 5 percent duty cycle. The response time was found to be less than 10 $\mu$sec.

A typical inductive loop assembly is shown in FIG. 1. The active loop 11 extending into the cavity may be fabricated from a conductive wire (such as a piece of AWG No. 12 copper wire) or it may be fabricated from a silver or gold plated ribbon of rectangular copper stock. Such types of conductors and their characteristics are well known in the high frequency art. A typical length of the conductor in a 3 ⅛ inch diameter cavity is approximately 1 ⅜ inches long, extending approximately ½ inch into the cavity with the distance from the near end of the loop to the shorted end of the cavity being approximately ⅛ $\lambda$. These values are not critical. From the mathematical analysis of the invention, to be presented later, those practicing this invention will readily adapt the principles set forth herein to their particular circuit. The external part of the loop circuit is shielded by the case 12 and cover 13. The case and cover is fabricated from a conductive metal, preferably the same as that from which the cavity to which it is attached is fabricated. Typical examples are plated brass, copper, or aluminum.

The switching diode 14 is preferably a PIN type diode. Examples of diodes that have proven suitable for this device are the GHZ 40021 and the microwave associates type 7078. The characteristics of the diode used will affect the tuning shift, as will be shown later in the analysis of the circuit. Generally the diode must be suitable for operation in the desired frequency band (the C operation is described herein), it must also have a low forward resistance, present a low capacitance value in the reverse bias condition, and be capable of dissipating the required heat loss. Typical values for operating embodiments in the C band at the powers previously mentioned are, forward resistances in the ranges ½ to 1 ohm, capacitance values between electrodes in the ranges of 0.3 to 0.7 pF and dissipations of approximately 6 watts. In constructing these devices attention should be given to provide a good heat sink to the diode. The diode 14 is attached to the machine screw 15 which threads into the case 12. The diode may be soldered directly to the brass screw to provide a good heat sink for the diode, being careful not to get the diode too hot. A good electrical contact is made to the other end of the diode by the compression of bellows 16 as the diode-screw assembly is screwed into the case 12. (Servometer Company part number 2146 is a suitable bellows.) The diameter of the bellows should be large enough to assure contact over the diode contact surface to aid in heat dissipation as well as making good electrical contact. The conductive rod 17 is used to make contact with the inductive loop element 11, the other connection end of the bellows 16, and by being a light press fit in high frequency insulation block 18 it provides mechanical support by which to position and take the compression force of the bellows.

The conventional feed through filter 19 provides a radio frequency short circuit to ground (through the case 12 and its electrical attachment to the cavity). In addition to providing the capacitance to ground for that end of the loop it also provides an insulated path for the dc bias voltage to the diode for turning it "ON" or "OFF". (A suitable feed through filter is the Allen Bradley type number FA5C-1012.) Electrical connection is made from the feed through filter 19 to the conventional low capacity feed through stand-off connection 20 by the soldered short length of wire conductor 21.

The partition 22 in the case is desirable to provide an RF shield between the two compartments. The compartment where the diode is located does have RF energy in it. The other compartment providing the dc biasing connections should not be exposed to RF energy otherwise the RF energy will be conducted down the dc bias connecting wires which, as is well known, would be undesirable to the operation of the electronic equipment. It is also desirable that the capacitance of the insulated feed through terminal 20 be of a very low value. The capacitance of the feed through filter 19 is required for the RF circuit in the inductive loop. It is to be recognized, however, that the speed with which the diode may be switched will be determined in part by the total capacity to ground of the feed through filter 19 and the insulated feed through connection 20. Thus, it is desirable that a low capacitance feed through terminal 20 be used or the generally desired switching speeds of less than 10 $\mu$sec will not be obtainable by the diode.

Figure 2:
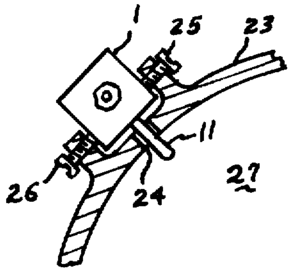
FIG. 2 is a representative view showing the mounting of an inductive loop on a resonant cavity.

FIG. 2 shows a typical means of mounting the inductive loop assembly 1, as shown in FIG. 1, to the side wall 23 of a conventional cylindrical resonant cavity. The inductive loop 11 extends into the cavity through a longitudinal slot 24 in the cavity. The slot in the cavity wall is made parallel to the longitudinal axis of the cavity and slightly larger than the conductor of the loop and the loop is positioned in the slot so that no contact is made with cavity shell 23 by the loop 11. Otherwise the loop would be shorted out both to dc switching voltage and the RF currents in the loop. Adjusting screws 25 and 26 provides means for centering the loop in the slot and for adjusting the penetration of the loop into the cavity 27.

Any number of inductive loop assemblies as shown in FIG. 1 may be used with a resonant cavity; the number used depending upon the amount of shift desired in the frequency of the resonant cavity. For a typical operating embodiment of the invention four have been used for each cavity, mounted as shown in FIGS. 3 and 4, to provide approximately a three percent frequency shift.

Figure 5:
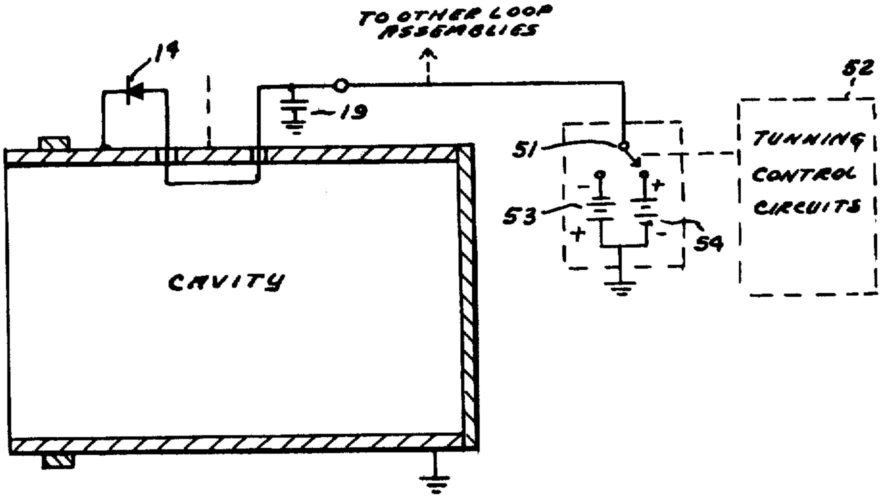
FIG. 5 is a simplified schematic diagram showing a representative circuit system for switching the resonant frequency of a resonant cavity.
Figure 6:
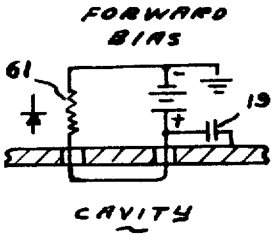
FIG. 6 is a schematic diagram representing a forward biased inductive loop.
Figure 7:
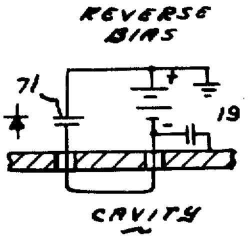
FIG. 7 is a schematic diagram representing a reversed biased inductive loop.

FIG. 5 shows a simplified schematic view of a representative diode switching system. It is to be understood that generally in practicing this invention much more complicated, but conventional, electronic circuits utilizing conventional solid state switching elements and digital controlling circuits will be used. For illustration, a single-pole double-throw set of contacts 51 is shown, activated by a tuning control circuit 52, for switching the bias voltage potential on the PIN diode 14. A plurality of inductive loops may be switched from the same voltage sources by parallel connecting to the switching system as indicated in FIG. 5. Using a type of PIN diode as previously referred to it has been found that a reverse bias voltage 53 of approximately (minus) 50 volts was suitable to provide the OFF state of the diode and a voltage 54 such that approximately 80 milliamperes of forward current (small + voltage) flowed through the diode would provide the ON state. Those practicing this invention will readily adapt the voltages to suit the particular diode they are using. When the diode is in the ON state the diode may be represented in the loop circuit by a low value resistance 61 as shown in FIG. 6. When the diode is placed in the OFF state by a reverse bias as shown in FIG. 7 the diode may be represented by a very small capacitance 71. This is quite frequently referred to as the "open circuit" condition, but it is not quite an open circuit to the RF due to the small capacitance existing across the diode.

THE EQUIVALENT CIRCUIT AND MATHEMATICAL ANALYSIS DETERMINING THE FREQUENCY SHIFT PER DIODE

The understanding of the operation of this invention and the developing of suitable criteria for selecting suitable components for particular applications of the invention may best be accomplished by assuming the device is used for shifting the output frequency of a typical transmitter cavity power oscillator.

The cavity oscillator is a tuned line-length device. The resonator sections are shorted quarter wavelengths at the operating frequency. Assuming that the resistive component of the cavity is negligible (a valid assumption, as the cavity is gold-plated) the impedance of the cavity resonator at a distance $l$ from the shorted end is:

$$Z = j\, Z_o \tan \beta l$$

where $Z_o$ = characteristic impedance of the line
$l$ = electrical length of line from the short
$\beta$ = phase constant.

The characteristic impedance of the cavity oscillator is derived from its physical dimensions.

$$Z_o = \frac{138}{\sqrt{\epsilon}} \log_{10} \frac{D}{d} \quad (2)$$

where $\epsilon$ = relative dielectric constant
$D$ = inner diameter of the outer conductor
$d$ = outer diameter of the inner conductor.

For the cavity oscillator under discussion, $\epsilon = 1$ for air dielectric and therefore $Z_o = 138 \log_{10} D/d$. The ratio of diameters is 1.40 for this cavity, therefore $Z_o = 20$ ohm.

Figure 8:
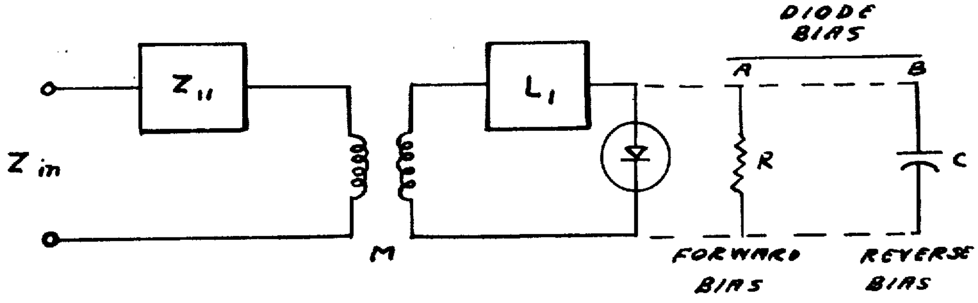
FIG. 8 is a representative equivalent schematic circuit diagram for analyzing the effective change in the impedance of a resonant cavity as the bias on the diode of an inductive loop is changed.

Frequency shifting is performed by switching an impedance through the loop coupling into the cavity oscillator resonating circuitry. Since loop coupling is used, the mathematical model is that of a transformer with the cavity circuitry for the primary and the diode-loop assembly as the secondary as shown in FIG. 8. The diode-loop assembly has two states; diode forward bias and diode reverse bias. Both states of the secondary are coupled to the primary by the coupling loop.

From FIG. 8:

$Z_{11}$ = impedance of the cavity oscillator
$Z_{in}$ = composite of the total impedance
M = mutual inductance
$L_1$ = inductance of the loop in the secondary
A and B = two states of the diode Since the diode is a PIN diode the leakage resistance and stray capacitances are negligible at this operating frequency.

From equations of networks, the input impedance of a 4-terminal network is:

$$Z_{in} = Z_{11} - \frac{Z_{12} Z_{21}}{Z_{22}+Z_L} \quad (3)$$

where:

$Z_{11}$ = impedance of the first circuit with secondary open circuited
$Z_{12}$ and $Z_{21}$ = transfer impedances between the primary and secondary
$Z_{22}$ = impedance of the secondary with the primary open circuited
$Z_L$ = load impedance on the secondary, i.e., diode impedance.

For a transformer:

$Z_{12} = Z_{21} = j\omega M$ (4)

therefore:

$$Z_{in} = Z_{11} - \frac{(j\omega M)^2}{Z_{22}+Z_L} \quad (5)$$

which can be simplified to:

$$Z_{in} = Z_{11} - \Delta Z \quad (6)$$

where $$\Delta Z = \frac{(j\omega M)^2}{Z_{22}+Z_L} \quad (7)$$

For the state with the diode forward biased:

$$\Delta Z_A = \frac{(\omega M)^2}{R+j\omega L_1}$$ neglecting spray capacitance and diode case capacitance.

For the state with the diode reverse biased:

$$\Delta Z_B = -\frac{(\omega M)^2}{j(\omega L_1 - \frac{1}{\omega C})}$$ neglecting leakage resistance (9)

By combining the previous analysis it can be shown that:

$$Z_A = Z_{11} + \frac{(\omega M)^2}{R+j\omega L_1} \quad (10)$$

where $Z_A = Z_{in}$ at "A" bias state, and $$Z_B = Z_{11} + \frac{(\omega M)^2}{j(\omega L_1 - \frac{1}{\omega C})} \quad (11)$$

where $Z_B = Z_{in}$ at "B" bias state.

$Z_{11}$ was defined in equation (1) as $Z_{11} = j\, Z_o \tan \beta l$

By examining equations (10) and (11) in detail, it can be seen that $Z_{11}$ is a function of line length in the cavity oscillator. Physically, the loop assembly is about half way up from the shorted end; therefore $l \simeq \frac{1}{8}\lambda$ or $\beta l = 45°$ (12)

and from equation (1) $Z_{11} = j\, Z_o \tan \beta l$ $Z_{11} = j\, Z_o$ since $\tan 45° = 1$ (13)

Therefore $Z_{11}$ is inductive and equation (5) can be restated as $X_{in} = Z_o - \Delta X$ (14)

remembering that $Z_{11} = Z_o \tan \beta l$, where $\tan \beta l = 1$, and $$\Delta X_A = +\frac{(\omega M)^2}{X_{L_1}} \quad (15)$$

$R << X_{L_1}$ and $$\Delta X_B = \frac{(\omega M)^2}{X_{L_1} - X_c} \quad (16)$$

Assume $X_c > X_{L_1}$ at $f_o$ where $f_o$ = cavity operating frequency;

then $$\Delta X_B = -\frac{(\omega M)^2}{X_c - X_{L_1}} \quad (17)$$

Now examine equation (14) with equations (16) and (17) to ascertain how the frequency will change as the diode bias changes.

$$X_A = Z_o - \frac{(\omega M)^2}{X_{L_1}} \quad (18)$$

$X_A = X_{in}$ at A bias state $$X_B = Z_o + \frac{(\omega M)^2}{X_c - X_{L_1}} \quad (19)$$

$X_B = X_{in}$ at "B" bias state.

These equations (18 and 19) show that for the reverse bias state of the diode (state B), the inductive reactance presented to the oscillator increases. The oscillation frequency of the cavity oscillator then must decrease to maintain equilibrium. Conversely, a forward biased diode causes the frequency of oscillation to increase.

Assume that the diode is forward biased. Then the $\Delta X$ transformed to the cavity oscillator when the diode is reverse biased is $X_B - X_A$, equations (19) and (18)

$$\Delta X = X_B - X_A = (\omega M)^2 \left( \frac{1}{X_C - X_{L_2}} + \frac{1}{X_{L_1}} \right) \quad (20)$$

Another expression for ΔX can be derived using the expression for frequency of a series resonant circuit.

$$f = \frac{1}{2\pi\sqrt{LC}} \quad (21)$$

The rate of change of $f$ is:

$$\frac{df}{dC} = - \frac{2\pi\sqrt{L}\,\frac{1}{2\sqrt{C}}}{4\pi^2\, LC} = - \frac{\sqrt{L}}{4\pi\sqrt{C}\, LC} = \frac{\quad}{2\pi\sqrt{LC}\,(2C)}$$

or $$\frac{\Delta f}{\Delta C} = - \frac{f}{2C} \quad (22)$$

also $$\frac{\Delta f}{\Delta L} = - \frac{f}{2L} \quad (23)$$

and $$\Delta f = - \frac{\Delta C}{2C} f = - \frac{\Delta L}{2L} f = - \frac{\Delta X}{2X} f \quad (24)$$

where $f$ = center frequency

X = initial reactance of either L or C.

For a frequency change of −5 MHz per diode at 740 MHz:

$$\frac{-\Delta f}{f} = \frac{-5}{740} = \frac{\Delta X}{2X} = .0068$$

The center frequency of the cavity oscillator is 740 MHz.

From equation (18)

$$X_A = Z_o - \frac{(\omega M)^2}{X_{L_1}}$$

This is the initial X for equation (24). Therefore:

$$\Delta X = \frac{\Delta f}{f} 2X = (2)(.0068)\left( Z_o - \frac{(\omega M)^2}{X_{L_1}} \right) \quad (25)$$

and from equation (20)

$$\Delta X = (\omega M)^2 \left( \frac{1}{X_C - X_{L_2}} + \frac{1}{X_{L_1}} \right) \quad (26)$$

Therefore equating equations (20) and (25).

$$(2)(.0068)\left( Z_o - \frac{(\omega M)^2}{X_{L_1}} \right) = (\omega M)^2 \left( \frac{1}{X_C - X_L} + \frac{1}{X_{L_1}} \right) \quad (27)$$

Solving for $X_{L_1}$:

$$X_{L_1} = \frac{K^2 X_{L_2} X_C + 2\alpha K^2 X_{L_2} X_C - Z\alpha Z_o X_C}{2\alpha K^2 X_{L_2} - 2\alpha Z_o} \quad (28)$$

where:

$$\alpha = \frac{\Delta f}{f_o},\ K^2 = \frac{(\omega M)^2}{X_{L_1} X_{L_2}} = \text{coupling coefficient})^2$$

$X_{L_2} = Z_o \tan \beta l = 20$ ohms $= Z_o$.

For a given diode, $X_C$ can be calculated knowing the operating frequency and the diode capacitance when reverse biased. Various values of K are inserted into equation (28) and the resulting values of $X_{L_1}$ are calculated. Each $X_{L_1}$ and $X_c$ value is examined to determine the resonant frequency of the loop assembly, a parameter which can be easily measured.

Successful frequency shifting in the design occurred when the loop-diode resonant frequency was from 860 to 900 MHz. These measurements can be made at zero bias because the PIN diode capacitance remains relatively constant from 0 bias to reverse bias condition when the frequency of measurement is above 500 MHz.

The relationship between loop-diode resonant frequency $f_2$, and oscillator frequency $f_o$, and the reactances $X_C$ and $X_{L_1}$ is as follows:

Let $X_{L_1} = X_L$ at $f_o$ and $X_{L_2} = X_L$ at $f_2$
$X_{C_1} = X_C$ at $f_o$ $X_{C_2} = X_C$ at $f_2$ $$\text{then } \frac{X_{L_1}}{f_o} f_2 = X_{L_2} \quad \text{and} \quad \frac{X_{C_1}}{f_2} f_o = X_{C_2} \quad (29)$$

Set $X_{L_2} = X_{C_2}$ $$\text{then } X_{L_1} \frac{f_2}{f_o} = X_{C_1} \frac{f_o}{f_2} \quad (30)$$

Solving for $f_2$ $$f_2 = f_o \sqrt{\frac{X_{C_1}}{X_{L_1}}} \quad (31)$$

In this manner, comparison of calculated $f_2$ vs. measured $f_2$, the value of K for the circuit can be determined.

Although the effect of the primary impedances on the secondary circuitry has no bearing on these calculations, it is of interest to examine the effect. The resonance of the diode-loop is a measurement for reference only and is used to determine parameters which would be difficult to measure otherwise.

The reflected impedance is:

$$Z_R' = \frac{(\omega M)^2}{j Z_o} \quad (32)$$

The effect on $X_C$ due to $Z_R'$ is $\Delta$ $$\Delta = \frac{X_R'}{X_C} \times 100\% \text{ reverse bias state} \quad (33)$$

typically
$(\omega M)^2 = 18$
$X_C = 226$
therefore $$\Delta = \left(\frac{18}{20}/226\right) \times 100\%$$
$$\Delta = 0.4\%$$

I claim:

1. The improvement in a cavity of a resonant cylindrical cavity oscillator circuit, the said cavity having a longitudinal axis and a closed end, to provide an electrically controlled high speed shift in the resonant frequency of the resonant cavity, the said improvement comprising:

a. a longitudinal slot in the wall of the said cylindrical cavity;
b. an inductive loop extending through the said slot into the said cavity;
c. a PIN diode connected to one end of the said inductive loop;
d. a feed through filter connected to the other end of the said inductive loop; and
e. means including a source of direct current voltage for selectively either forwardly or reverse biasing the said PIN diode.

2. The improvement as claimed in claim 1 wherein the near end of the said loop is positioned approximately ⅛ wavelength away from the shorted end of the cavity.

3. The improvement as claimed in claim 2 wherein the said PIN diode has a forward resistance of less than one ohm and a capacitance value between electrodes of less than 0.7 pF.

* * * * *